US009811716B2

(12) United States Patent
Kim et al.

(10) Patent No.: US 9,811,716 B2
(45) Date of Patent: Nov. 7, 2017

(54) METHOD FOR FACE RECOGNITION THROUGH FACIAL EXPRESSION NORMALIZATION, RECORDING MEDIUM AND DEVICE FOR PERFORMING THE METHOD

(71) Applicant: KOREA INSTITUTE OF SCIENCE AND TECHNOLOGY, Seoul (KR)

(72) Inventors: Ig Jae Kim, Seoul (KR); Hee Seung Choi, Seoul (KR); Junghyun Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 108 days.

(21) Appl. No.: 14/941,812

(22) Filed: Nov. 16, 2015

(65) Prior Publication Data
US 2016/0148041 A1  May 26, 2016

(30) Foreign Application Priority Data

Nov. 21, 2014  (KR) .................. 10-2014-0163534

(51) Int. Cl.
*G06K 9/00* (2006.01)

(52) U.S. Cl.
CPC ..... *G06K 9/00228* (2013.01); *G06K 9/00208* (2013.01); *G06K 9/00268* (2013.01); *G06K 9/00302* (2013.01)

(58) Field of Classification Search
CPC ........... G06K 9/00228; G06K 9/00268; G06K 9/00302; G06K 9/00208
(Continued)

(56) References Cited

U.S. PATENT DOCUMENTS 6,088,040 A * 7/2000 Oda ................. G06T 13/40
                                                345/441
6,556,196 B1 * 4/2003 Blanz ............... G06K 9/00275
                                                345/419
(Continued)

FOREIGN PATENT DOCUMENTS

JP    2006-351007 A    12/2006
JP    2014-137719 A    7/2014

OTHER PUBLICATIONS

Vlasic, Daniel, et al. "Face transfer with multilinear models." *ACM Transactions on Graphics (TOG)*. vol. 24, No. 3, ACM, 2005, pp. 426-433.
(Continued)

*Primary Examiner* — Kanjibhai Patel
(74) *Attorney, Agent, or Firm* — NSIP Law

(57) ABSTRACT

A method for face recognition through facial expression normalization includes: fitting an input two-dimensional face image into a three-dimensional face model by using a three-dimensional face database; normalizing the three-dimensional face model into a neutral-expression three-dimensional face model by using a neutral-expression parameter learned from the three-dimensional face database; converting the neutral-expression three-dimensional face model into a neutral-expression two-dimensional face image; and recognizing the neutral-expression two-dimensional face image from a two-dimensional face database. Accordingly, face recognition may be performed with high reliability without a loss of information.

17 Claims, 5 Drawing Sheets

(58) Field of Classification Search
USPC .......................................................... 382/118
See application file for complete search history.

(56) References Cited

U.S. PATENT DOCUMENTS

| | | | |
|---|---|---|---|
| 7,415,152 B2* | 8/2008 | Jiang | G06K 9/00288 |
| | | | 345/473 |
| 9,317,954 B2* | 4/2016 | Li | |
| 9,483,860 B2* | 11/2016 | Hwang | G06T 13/40 |
| 2014/0043329 A1* | 2/2014 | Wang | G06T 17/20 |
| | | | 345/420 |

OTHER PUBLICATIONS

Chang, Kyong I., W. Bowyer, and Patrick J. Flynn. "Multiple nose region matching for 3D face recognition under varying facial expression." Pattern Analysis and Machine Intelligence, IEEE Transactions on 28.10 (2006): 1695-1700.

Blanz, Volker, and Thomas Vetter. "A morphable model for the synthesis of 3D faces." Proceedings of the 26th annual conference on Computer graphics and interactive techniques. ACM Press/Addison-Wesley Publishing Co., 1999., pp. 1-8.

\* cited by examiner

METHOD FOR FACE RECOGNITION THROUGH FACIAL EXPRESSION NORMALIZATION, RECORDING MEDIUM AND DEVICE FOR PERFORMING THE METHOD

CROSS-REFERENCE TO RELATED APPLICATION

This application claims priority to Korean Patent Application No. 10-2014-0163534, filed on Nov. 21, 2014, and all the benefits accruing therefrom under 35 U.S.C. §119, the contents of which in its entirety are herein incorporated by reference.

BACKGROUND

1. Field

The present disclosure relates to a method for face recognition through facial expression normalization, and a recording medium and device for performing the method, and more particularly, to a method for face recognition through facial expression normalization based on a three-dimensional face model, and a recording medium and device for performing the method.

2. Description of the Related Art

An existing face recognition method is known to give excellent performance in a neutral expression state where a target face to be recognized stares at the front (for example, FERET, FRVT or the like). However, if an expression of the target face changes, the performance deteriorates. In particular, in an unconstrained circumstance such as CCTV or a black box, a target person has various face expressions, and thus satisfactory performance is not expected when used for recognition without revision of the face image.

In order to solve this problem, in the existing technique, various face expressions are studied in a two-dimensional image so that face features robust against an expression change are extracted and used for recognition, or a region (for example, a region around the mouth) seriously changed depending on face expressions is not used for recognition.

However, the above techniques require a large amount of learning database, and information of essential regions for identity recognition is limitedly used, thereby failing to solve the fundamental problem. Meanwhile, there has been reported that a three-dimensional modeling technique is utilized to generate a three-dimensional face from a single two-dimensional image or use shape and texture parameters of a model for recognition, but they do not yet deal with the change of expressions of a face.

SUMMARY

The present disclosure is directed to providing a method for face recognition (hereinafter, also referred to as a face recognition method), which may be performed without a loss of information by generating a normalized face with a neutral expression.

The present disclosure is also directed to providing a recording medium on which a computer program for performing the method for face recognition through facial expression normalization is recorded.

The present disclosure is also directed to providing a device for performing the method for face recognition through facial expression normalization.

In one aspect, there is provided a method for face recognition through facial expression normalization, which includes: fitting an input two-dimensional face image into a three-dimensional face model by using a three-dimensional face database; normalizing the three-dimensional face model into a neutral-expression three-dimensional face model by using a neutral-expression parameter learned from the three-dimensional face database; converting the neutral-expression three-dimensional face model into a neutral-expression two-dimensional face image; and recognizing the neutral-expression two-dimensional face image from a two-dimensional face database.

In an embodiment of the present disclosure, in the fitting of an input two-dimensional face image into a three-dimensional face model, an expression parameter of a three-dimensional face model of the input two-dimensional face image may be predicted.

In an embodiment of the present disclosure, in the fitting of an input two-dimensional face image into a three-dimensional face model, at least one parameter may be extracted among identity and expression of the three-dimensional face model.

In an embodiment of the present disclosure, in the fitting of an input two-dimensional face image into a three-dimensional face model, a multi-linear modeling technique may be used.

In an embodiment of the present disclosure, in the normalizing of the three-dimensional face model into a neutral-expression three-dimensional face model, the predicted parameter may be normalized with the neutral-expression parameter.

In an embodiment of the present disclosure, the method for face recognition through facial expression normalization may further include converting the neutral-expression three-dimensional face model into a two-dimensional face image of various expressions.

In an embodiment of the present disclosure, the three-dimensional face database may be constructed in advance to include various kinds of target and expression information.

In an embodiment of the present disclosure, the two-dimensional face database may include at least one of an identity card, a passport and a criminal photo.

In another aspect of the present disclosure, there is provided a computer-readable recording medium on which a computer program for performing the method for face recognition through facial expression normalization is recorded.

In another aspect of the present disclosure, there is provided a device for face recognition through facial expression normalization, which includes: a fitting unit configured to fit an input two-dimensional face image into a three-dimensional face model by using a three-dimensional face database; a normalizing unit configured to normalize the three-dimensional face model into a neutral-expression three-dimensional face model by using a neutral-expression parameter learned from the three-dimensional face database; a converting unit configured to convert the neutral-expression three-dimensional face model into a neutral-expression two-dimensional face image; and a recognizing unit configured to recognize the neutral-expression two-dimensional face image from a two-dimensional face database.

In an embodiment of the present disclosure, the fitting unit may predict an expression parameter of a three-dimensional face model of the input two-dimensional face image.

In an embodiment of the present disclosure, the fitting unit may extract at least one parameter among identity and expression of the three-dimensional face model.

In an embodiment of the present disclosure, the fitting unit may use a multi-linear modeling technique.

In an embodiment of the present disclosure, the normalizing unit may normalize the predicted parameter with the neutral-expression parameter.

In an embodiment of the present disclosure, the converting unit may convert the neutral-expression three-dimensional face model into a two-dimensional face image of various expressions.

In an embodiment of the present disclosure, the three-dimensional face database may be constructed in advance to include various kinds of target and expression information.

In an embodiment of the present disclosure, the two-dimensional face database may include at least one of an identity card, a passport and a criminal photo.

If the face recognition method through facial expression normalization as described above is used, when a two-dimensional face image is input, expression information of various faces are predicted by fitting with a three-dimensional face model to generate a face image normalized with a neutral expression, and the image normalized with the neutral expression is utilized for face recognition. Accordingly since information of all regions of the face may be used for face recognition, face recognition may be performed without a loss of information.

In addition, face recognition may be performed without revising an existing face recognition algorithm by predicting expression information of an input face by using a multi-linear face model technique or the like and normalizing into a neutral expression. In addition, among identity and expression information of the face predicted by linear face modeling or the like, the expression information may be used as a neutral expression to generate a normalized face image, which may solve a deteriorated recognition accuracy caused by the change of expressions, which is a problem of an existing face recognition method.

DETAILED DESCRIPTION

Figure 1:
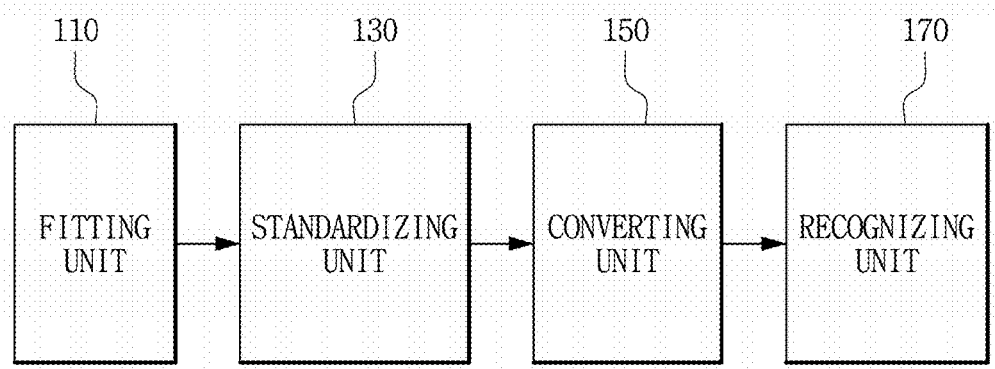
FIG. 1 is a block diagram showing a device for face recognition (hereinafter, also referred to as a face recognition device) through facial expression normalization according to an embodiment of the present disclosure.

The following detailed description of the present disclosure refers to the accompanying drawings which show specific embodiments implemented by the present disclosure. These embodiments are described in detail so as to be easily implemented by those skilled in the art. It should be understood that various embodiments of the present disclosure are different from each other but not exclusive from each other. For example, specific shapes, structures and features written herein can be implemented in other embodiments without departing from the scope of the present disclosure. In addition, it should be understood that locations or arrangements of individual components in each embodiment may be changed without departing from the scope of the present disclosure. Therefore, the following detailed description is not directed to limiting the present disclosure, and the scope of the present disclosure is defined just with the appended claims along and their equivalents, if it is suitably explained. In the drawings, like reference numerals denote like elements through several drawings.

Hereinafter, embodiments of the present disclosure will be described in detail with reference to the accompanying drawings.

Figure 2:
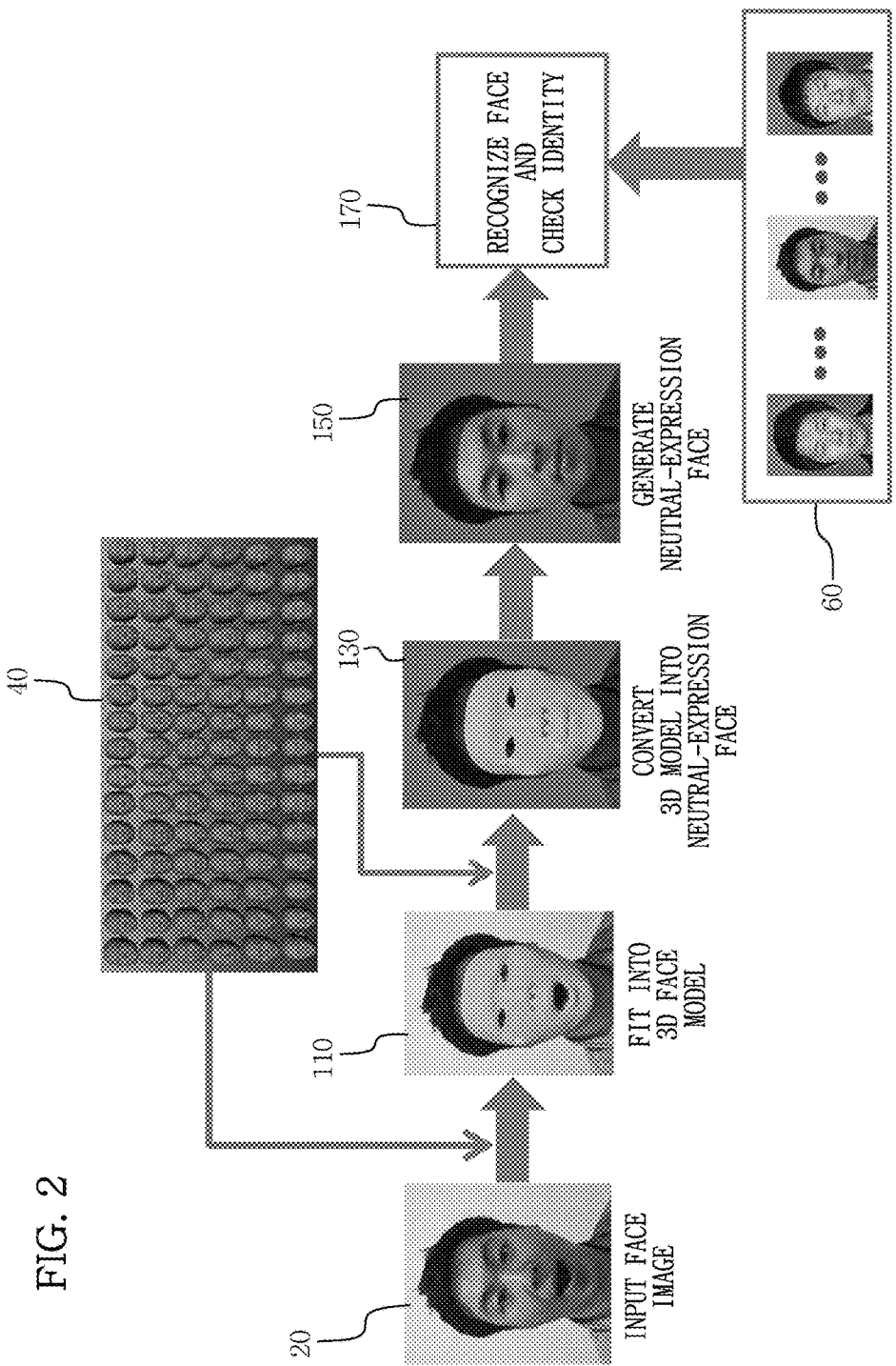
FIG. 2 is a diagram for illustrating operations performed by the face recognition device through facial expression normalization, depicted in FIG. 1.

FIG. 1 is a block diagram showing a face recognition device through facial expression normalization according to an embodiment of the present disclosure. FIG. 2 is a diagram for illustrating operations performed by the face recognition device through facial expression normalization, depicted in FIG. 1.

Referring to FIGS. 1 and 2, a device 10 face recognition through facial expression normalization according to the present disclosure (hereinafter, also referred to as a device 10) includes a fitting unit 110, a normalizing unit 130, a converting unit 150 and a recognizing unit 170.

Software (or, an application) for performing face recognition through facial expression normalization may be installed and executed at the device 10 of the present disclosure, and a component such as the fitting unit 110 may be controlled by software for performing the face recognition through facial expression normalization, executed at the device 10.

The device 10 may be a separate terminal or a partial module of a terminal. In addition, the components such as the fitting unit 110 may be configured as an integrated module or as at least one module. However, the components may also be configured as separate modules, on the contrary to the above.

The device 10 may be movable or stationary. The device 10 may be in the form of a server or an engine and may also be called with other terms such as a device, an apparatus, a terminal, a UE (user equipment), a MS (mobile station), a wireless device, a handheld device or the like.

The device 10 may execute or produce various kinds of software on the basis of an operation system (OS), namely a system. The operation system is a system program for allowing software to use hardware of a device and may employ all kinds of mobile computer operation systems such as Android OS, iOS, Windows mobile OS, Bada OS, Symbian OS, Blackberry OS or the like and all kinds of computer operation systems such as Windows series, Linux series, Unix series, MAC, AIX, HP-UX or the like.

The device 10 may use a three-dimensional face database 40 constructed in advance. The three-dimensional face database 40 may include various kinds of target and expression information and may store suitable data depending on user environment such as regions, races, nations or the like. In addition, information may be updated depending on service environment. The three-dimensional face database 40 may be included in the device 10 or use an external database.

The fitting unit 110 fits an input two-dimensional face image 20 into a three-dimensional face model by using the three-dimensional face database 40. The input two-dimensional face image 20 is a face image to be recognized, for example a photo of a criminal, a still CCTV image, a montage or the like.

For this, the fitting unit 110 uses a multi-linear modeling technique to predict an expression parameter of a three-dimensional face model of the input two-dimensional face image 20. The expression parameter may be at least one extracted parameter among identity and expression of the three-dimensional face model.

Figure 3:
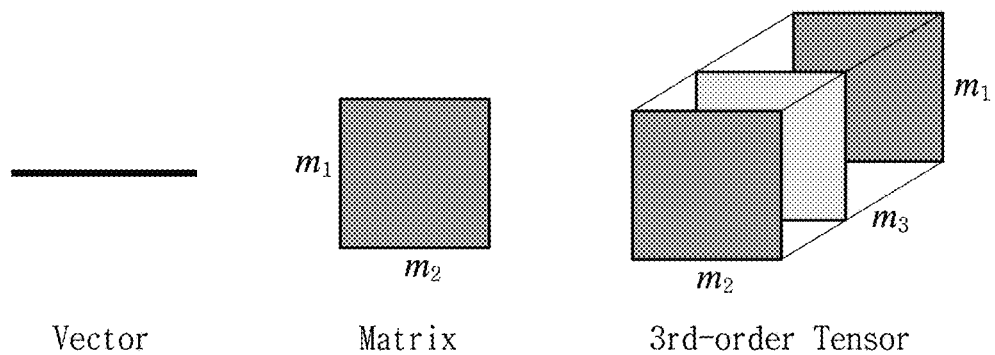
FIG. 3 is a diagram for illustrating the concept of a tensor of a multi-linear model.

Hereinafter, a multi-linear modeling technique for extracting a parameter such as identity and expression of the three-dimensional face model will be described as an example with reference to FIGS. 3 and 4A and 4B.

The multi-linear modeling may be regarded as a dimension-expanding modeling of a two-dimensional linear model, and a main basis is obtained through calculation on a vector space of three dimensions or above. Referring to FIG. 3, a tensor represents a vector space of three dimensions or above.

Assuming that a three-dimensional face database includes various identities and expressions, identity and expression parameters of a face may be extracted by means of a mode-n product of the multi-linear modeling technique.

Figure 4A:
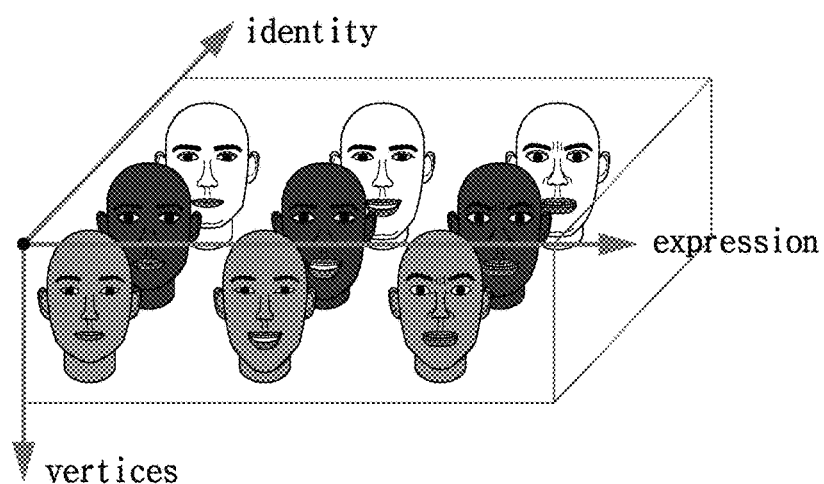
FIGS. 4A and 4B are diagrams for illustrating a multi-linear model for extracting a parameter of a three-dimensional face.
Figure 4B:
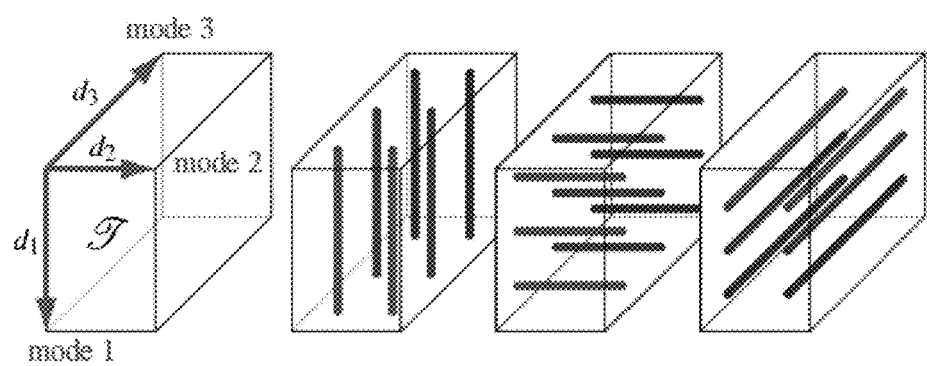

In detail, referring to FIG. 4A, identity and expression information of a three-dimensional face is arranged to configure a three-dimensional tensor, and referring to FIG. 4B, an identity and expression basis is extracted by mode classification of the three-dimensional tensor. This may be expressed as Equation 1 below.

$$D = Z x_1 U_1 x_2 U_2 x_3 U_3 x_4 \ldots x_n U_n \quad \text{Equation 1}$$

In Equation 1, Z is called a core tensor, which is a matrix for forming a relation between mode matrixes, and $U_n$ represents a mode-n matrix. Here, $U_n$ may be configured with bases of various elements desired by a user such as an identity basis, an expression basis or the like of the three-dimensional face.

Therefore, the process of fitting a three-dimensional model into an input face represents a process of predicting Z, and if $U_n$ configured in advance is used, Z may be easily obtained. The method for obtaining Z may utilize N-mode SVD where two-dimensional SVD (Singular Vector Decomposition) is expanded, and this may be expressed like Equation 2 below.

$$Z = D x_1 x_2 \ldots x_n \ldots x_N \quad \text{Equation 2}$$

If the identity and expression basis of the three-dimensional face is classified through the above process, a neutral-expression three-dimensional face may be generated by transforming all parameters of a core tensor corresponding to the expression basis into parameters corresponding to the neutral expression.

The parameter corresponding to the neutral expression may be extracted by means of learning using neutral-expression faces. In addition, by using various expressions, an expression parameter corresponding to each expression may be learned. Learning a neutral-expression or expression parameter may be performed at a separate learning unit (not shown) or may also be performed at the fitting unit 110 or the converting unit 150.

The normalizing unit 130 normalizes the three-dimensional face model into a neutral-expression three-dimensional face mode by using the neutral-expression parameter learned from the three-dimensional face database. In other words, the predicted parameter is normalized into a neutral-expression parameter.

In the present disclosure, when a two-dimensional face image 20 is input, it is fitted into a three-dimensional face model to predict expression information of various faces and generate a face image normalized with a neutral expression. Therefore, information of all regions of the face may be used for face recognition without any loss of information. In addition, even though it has been difficult in an existing technique to use two-dimensional face images of different expressions for face recognition, in the present disclosure, this problem is solved by using a neutral-expression face, and further various expressions may be reconfigured based on the neutral-expression face.

The converting unit 150 converts the neutral-expression three-dimensional face model into a neutral-expression two-dimensional face image. In the present disclosure, among identity and expression information of the face predicted through linear face modeling, expression information is used to generate a face image normalized with a neutral expression, thereby solving an expression change problem which is one of problems of an existing face recognition technique.

In addition, the converting unit 150 may convert the neutral-expression three-dimensional face model into two-dimensional face images of various expressions by using the learned expression parameter.

The recognizing unit 170 recognizes the neutral-expression two-dimensional face image from a two-dimensional face database 60. This utilizes the image normalized with a neutral expression, and the two-dimensional face database 60 may be an identity card, a passport or a criminal photo.

The recognizing unit 170 may extract at least one candidate similar or most similar to the neutral-expression two-dimensional face image from the two-dimensional face database 60. In addition, since face images of various expressions may be generated using the converting unit 150, it is possible to generate a comparative image according to an expression of an identity card, a passport or a criminal photo and compare them.

Accordingly, it is possible to enhance accuracy in face recognition or identity checking, and face recognition may be performed without modifying an existing face recognition algorithm.

Figure 5:
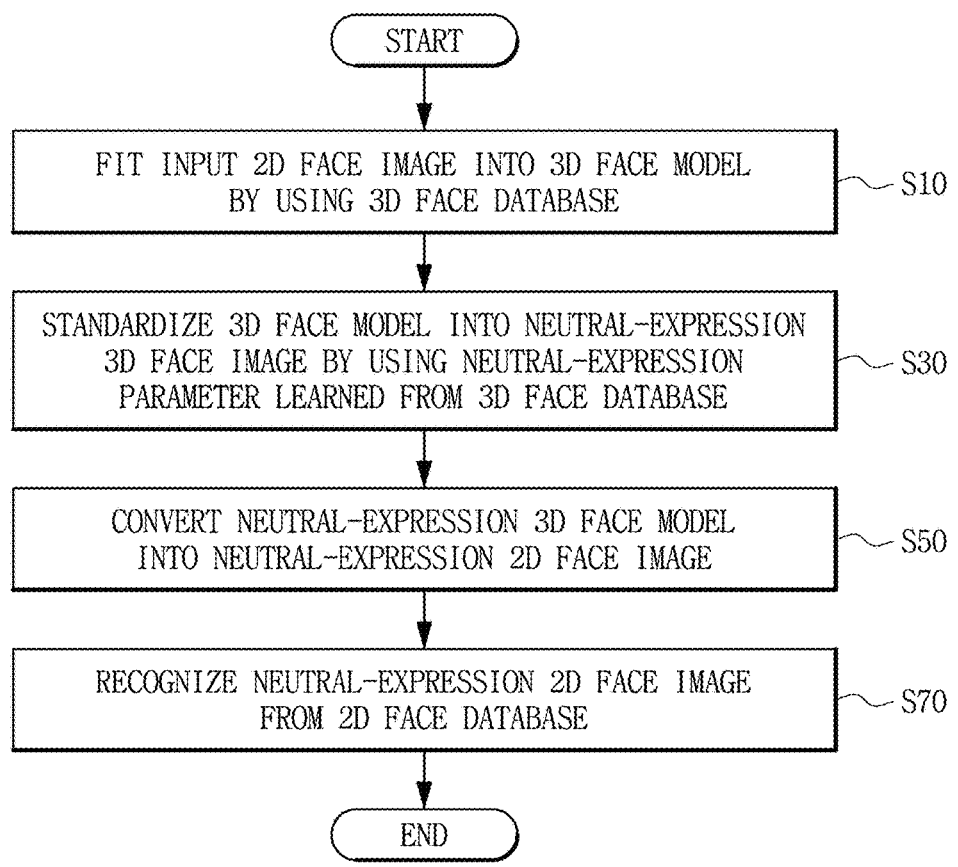
FIG. 5 is a flowchart for illustrating a face recognition method through facial expression normalization according to an embodiment of the present disclosure.

FIG. 5 is a flowchart for illustrating a face recognition method through facial expression normalization according to an embodiment of the present disclosure.

The face recognition method through facial expression normalization according to this embodiment may be executed in substantially the same configuration as the device 10 of FIG. 1. Therefore, an element identical to that of the device 10 of FIG. 1 is designated with the same reference symbol and is not described again in detail. In addition, the face recognition method through facial expression normalization according to this embodiment may be performed by software (or, an application) for face recognition.

Referring to FIG. 5, in the face recognition method through facial expression normalization according to this embodiment, a two-dimensional face image is fitted into a three-dimensional face model by using a three-dimensional face database (S10).

The three-dimensional face database includes various kinds of target and expression information and may be constructed in advance. The three-dimensional face database may include various kinds of target and expression information and may store suitable data depending on user environment such as regions, races, nations or the like. In addition, information may be updated depending on service environment.

In the step of fitting the input two-dimensional face image into a three-dimensional face model (S10), an expression parameter of the three-dimensional face model of the input two-dimensional face image is predicted. For this, a multi-linear modeling technique may be used, and at least one parameter may be extracted among identity and expression of the three-dimensional face model.

The input two-dimensional face image is a face image to be recognized and may be a photo of a criminal, a still CCTV image, a montage or the like.

After the two-dimensional face image is fitted into a three-dimensional face model, the three-dimensional face model is normalized into a neutral-expression three-dimensional face model by using a neutral-expression parameter learned from the three-dimensional face database (S30). In other words, the predicted parameter is normalized into a neutral-expression parameter.

A parameter corresponding to the neutral expression may be extracted by learning neutral-expression faces. In addition, an expression parameter corresponding to each expression may be learned by using various expressions.

Learning an expression or neutral-expression parameter may be performing using the three-dimensional face database in a pre-process performed before the face recognition method through facial expression normalization according to the present disclosure is performed. In addition, the learning may also be performed in the step of fitting the input two-dimensional face image into a three-dimensional face model (S10) the step of normalizing the three-dimensional face model into a neutral-expression three-dimensional face model (S30).

In the present disclosure, when a two-dimensional face image is input, it is fitted into a three-dimensional face model to predict expression information of various faces and generate a face image normalized with a neutral expression. Therefore, information of all regions of the face may be used for face recognition without any loss of information.

If the neutral-expression three-dimensional face model is generated, the neutral-expression three-dimensional face model is converted into a neutral-expression two-dimensional face image (S50). In the present disclosure, among identity and expression information of the face predicted through linear face modeling, expression information is used to generate a face image normalized with a neutral expression, thereby solving an expression change problem which is one of problems of an existing face recognition technique.

In addition, the neutral-expression three-dimensional face model may be converted into two-dimensional face images of various expressions by using the learned expression parameter.

In the present disclosure, the neutral-expression three-dimensional face model may be converted into two-dimensional face images of various expressions by using the learned expression parameter. By doing so, it is possible to extract not only a neutral-expression face image but also a face image of various expressions.

The neutral-expression two-dimensional face image is recognized from the two-dimensional face database (S70). At least one candidate similar or most similar to the neutral-expression two-dimensional face image may be extracted from the two-dimensional face database. This utilizes an image normalized with a neutral expression, and the two-dimensional face database may be an identity card, a passport or a criminal photo.

In addition, since face images of various expressions may be generated based on the neutral-expression three-dimensional face model, it is possible to generate a comparative image according to an expression of an identity card, a passport or a criminal photo and compare them.

Accordingly, it is possible to enhance accuracy in face recognition or identity checking, and face recognition may be performed without modifying an existing face recognition algorithm.

The face recognition method by facial expression normalization as described above may be implemented as an application or program commands executable by various kinds of computer means and recorded on a computer-readable recording medium. The computer-readable recording medium may include program commands, data files, data structures or the like solely or in combination.

The program commands recorded on the medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a complier but also high-level language codes executable by a computer by using an interpreter. The hardware device may be configured to operate as at least one software module to perform the operations of the present disclosure, or vice versa.

While the exemplary embodiments have been shown and described, it will be understood by those skilled in the art that various changes in form and details may be made thereto without departing from the spirit and scope of this disclosure as defined by the appended claims.

In the present disclosure, if a two-dimensional face image is input, this is fitted into a three-dimensional face model to predict expression information of various faces so that a face image normalized with an neutral expression is generated, and the image normalized with the neutral expression is utilized for face recognition.

Thus, the face recognition through facial expression normalization according to the present disclosure may be usefully applied to a security field. According to a report of International Biometric Group (IBG), the scale of the international face recognition market keeps growing at a rate of 29.5% every year and is predicted to be 1.5 billion dollars in 2014. If a normalized face image is generated using the method of the present disclosure, it is expected to have a great ripple effect since this method may be instantly applied to an existing recognition system.

In particular, since a recognized target face has very diverse expressions in an unconstrained circumstance such as CCTV or a black box, if the method of the present disclosure is used, the face information may be broadly utilized, and thus it is expected that this method may be very useful in an intelligent image security market.

In addition, the face recognition through facial expression normalization according to the present disclosure may be widely utilized for entertainment fields. If the method of the present disclosure is used, minute information of a face such as an expression and a mouth shape may be predicted. Thus, the method of the present disclosure is expected to be usefully applied to various entertainment fields such as generation of actual avatars, various kinds of UI using expression recognition, UX applications or the like.

What is claimed is:

1. A method for face recognition through facial expression normalization, comprising:
   fitting an input two-dimensional face image into a three-dimensional face model by using a three-dimensional face database;
   normalizing the three-dimensional face model into a neutral-expression three-dimensional face model by using a neutral-expression parameter learned from the three-dimensional face database;

converting the neutral-expression three-dimensional face model into a neutral-expression two-dimensional face image; and recognizing the neutral-expression two-dimensional face image from a two-dimensional face database.

2. The method for face recognition through facial expression normalization according to claim 1, wherein in the fitting of an input two-dimensional face image into a three-dimensional face model, an expression parameter of a three-dimensional face model of the input two-dimensional face image is predicted.

3. The method for face recognition through facial expression normalization according to claim 2, wherein in the fitting of an input two-dimensional face image into a three-dimensional face model, at least one parameter is extracted among identity and expression of the three-dimensional face model.

4. The method for face recognition through facial expression normalization according to claim 2, wherein in the fitting of an input two-dimensional face image into a three-dimensional face model, a multi-linear modeling technique is used.

5. The method for face recognition through facial expression normalization according to claim 2, wherein in the normalizing of the three-dimensional face model into a neutral-expression three-dimensional face model, the predicted parameter is normalized into the neutral-expression parameter.

6. The method for face recognition through facial expression normalization according to claim 1, further comprising:

converting the neutral-expression three-dimensional face model into a two-dimensional face image of various expressions.

7. The method for face recognition through facial expression normalization according to claim 1, wherein the three-dimensional face database is constructed in advance to include various kinds of target and expression information.

8. The method for face recognition through facial expression normalization according to claim 1, wherein the two-dimensional face database includes at least one of an identity card, a passport and a criminal photo.

9. A computer-readable recording medium on which a computer program for performing the method for face recognition through facial expression normalization according to claim 1 is recorded.

10. A device for face recognition through facial expression normalization, comprising:

a fitting unit configured to fit an input two-dimensional face image into a three-dimensional face model by using a three-dimensional face database;

a normalizing unit configured to normalize the three-dimensional face model into a neutral-expression three-dimensional face model by using a neutral-expression parameter learned from the three-dimensional face database;

a converting unit configured to convert the neutral-expression three-dimensional face model into a neutral-expression two-dimensional face image; and a recognizing unit configured to recognize the neutral-expression two-dimensional face image from a two-dimensional face database.

11. The device for face recognition through facial expression normalization according to claim 10, wherein the fitting unit is configured to predict an expression parameter of a three-dimensional face model of the input two-dimensional face image.

12. The device for face recognition through facial expression normalization according to claim 11, wherein the fitting unit is configured to extract at least one parameter among identity and expression of the three-dimensional face model.

13. The device for face recognition through facial expression normalization according to claim 11, wherein the fitting unit is configured to use a multi-linear modeling technique.

14. The device for face recognition through facial expression normalization according to claim 11, wherein the normalizing unit is configured to normalize the predicted parameter with the neutral-expression parameter.

15. The device for face recognition through facial expression normalization according to claim 10, wherein the converting unit is configured to convert the neutral-expression three-dimensional face model into a two-dimensional face image of various expressions.

16. The device for face recognition through facial expression normalization according to claim 10, wherein the three-dimensional face database is constructed in advance to include various kinds of target and expression information.

17. The device for face recognition through facial expression normalization according to claim 10, wherein the two-dimensional face database includes at least one of an identity card, a passport and a criminal photo.

* * * * *